United States Patent [19]

Nakabayashi

[11] 3,778,589

[45] Dec. 11, 1973

[54] AIR OPERATING CORED WIRE
[75] Inventor: Masahiro Nakabayashi, Briarcliff Manor, N.Y.
[73] Assignee: Union Carbide Corporation, New York, N.Y.
[22] Filed: July 31, 1972
[21] Appl. No.: 276,779

[52] U.S. Cl.............. 219/146, 117/202, 117/206, 219/137
[51] Int. Cl............................................. B23k 35/22
[58] Field of Search.................. 219/145, 146, 137, 219/73; 117/202, 203, 204, 205, 206, 207; 148/24, 26

[56] References Cited
UNITED STATES PATENTS

| | | | |
|---|---|---|---|
| 3,177,340 | 4/1965 | Danhien | 219/146 |
| 3,453,142 | 7/1969 | Dorschu et al. | 117/205 |
| 3,573,426 | 4/1971 | Blake et al. | 219/146 |
| 3,560,702 | 2/1971 | Arikawa et al. | 219/146 |

Primary Examiner—J. V. Truhe
Assistant Examiner—George A. Montanye
Attorney—Paul A. Rose et al.

[57] ABSTRACT

A cored wire electrode for welding in air containing as major core materials Potassium Oxalate $K_2C_2O_4$; Magnesium Mg; and Manganese Oxide MnO.

7 Claims, No Drawings

AIR OPERATING CORED WIRE

This invention relates to electric arc welding electrodes and more particularly to a cored wire electrode for use in electric arc welding in air.

The advantages of a long continuous bare metal electrode containing core flux material have now become well known, especially for the general fabrication of mild steel. Electrodes of this type usually contain halides, oxides, deoxidizers and in some cases alloying agents. While this type of electrodes have generally met with success, there is a need to improve the electrode so that the arc created between the electrode and workpiece is not so harsh or spatter producing.

Accordingly it is the main object of this invention to provide a cored wire electrode which produces a smooth arc with less spatter than that produced by prior art electrodes.

Another object is to provide such an electrode that when alloying agents, such as nickel, are added to the core material, welds having increased impact properties over prior art electrodes are obtained.

It has unexpectedly been found that a core wire electrode for use in electric arc welding in air can be produced which provides on extremely smooth arc, good slag peeling and improved impact properties in the weld metal. Such an electrode contains potassium oxalate which acts primarily as an arc stabilizer and magnesium and manganese oxide. It has been found that the ratio of manganese oxide to magnesium should be maintained between 0.5 to about 2.0 in the flux core material. If the manganese oxide is too high the arc becomes unstable and the slag formed becomes to fluid. If the magnesium content is too high the arc becomes harsh with excessive spatter. When manganese oxide is too low the slag looses its viscosity and wetting actions is retarded. When magnesium is too low the arc becomes unstable.

Potassium oxalate additions improved arc stability and surprisingly also produced an essentially free feeling slag. It was found that potassium oxalate must be added in the amount of 0.5 to 2.5 percent weight of core.

Another ingredient in the flux core material is magnesium oxide which acts as a slag former. Other slag formers such as titanium oxide, silicon dioxide or zirconium oxide can be substituted in whole or in part for the magnesium oxide but in any event the slag former should be present in the range of from about 2 to about 10 weight percent of the core.

Calcium fluoride is also present as a slag former. The amount of calcium fluoride present depends on the amount and type of other slag formers present in the flux. For example some of the calcium fluoride may be replaced with titanium dioxide. However some calcium fluoride must be present in order to assist in the wetting action. Preferably the calcium fluoride is present in the range of from 35 to about 70 weight percent of the core. However as noted above the calcium fluoride content may be reduced by substituting some titanium dioxide for example.

Aluminum is present as a deoxidizer and nitride former. Aluminum may be present alone or as part of a magnesium-aluminum alloy. However the critical relationship of magnesium to manganese oxide must be maintained. It has unexpectedly been found that when the relationship of magnesium to manganese oxide is maintained, the manner in which aluminum is added to the flux is not as critical as has been found in other prior art electrodes. Aluminum may be present in the range of from 5 to about 20 weight percent of the core.

Also included in the flux core to provide the mechanical properties desired in the weld, is low carbon ferromanganese (FeMn), however manganese or different level carbon ferromanganese may be substituted for the low carbon ferromanganese. However some manganese must be present in order to achieve the mechanical properties. Low carbon ferromanganese is preferably used and is preferably in the range of from 3 to 9 weight percent of the core.

Nickel is also added to the flux core material in order to achieve high impact properties. Small additions of nickel expand the gamma loop and reduce growth of dendritic structure in the weld metal. It was found that nickel in the range of from 2 to about 5 weight percent of core produced the desired impact properties.

A preferred wire A of the invention consists of a mild steel sheath containing the following ingredients given in weight percent of the core.

| | |
|---|---|
| Aluminum | 15.0 |
| $CaF_2$ | 58.3 |
| MgO | 6.0 |
| Potassium Oxalate | 1.2 |
| MnO | 8.5 |
| L.C. FeMn | 6.0 |
| Magnesium | 5.0 |
| | 100.0 |

The core ratio is 18 percent.

For achieving high impact properties the wire is modified to consist of a mild steel sheath containing the following ingredients given in weight percent of the core.

| | |
|---|---|
| Aluminum | 11.0 |
| $CaF_2$ | 58.6 |
| MgO | 6.0 |
| Potassium Oxalate | 1.2 |
| MnO | 8.5 |
| L.C. FeMn | 6.0 |
| Magnesium | 5.0 |
| Nickel | 3.7 |
| | 100.0 |

The core ratio is 18 percent. This wire is designated wire B.

Another wire C of the invention was made using aluminum-magnesium alloy. This wire consisted of a mild steel sheath containing the following ingredients given in weight percent of the core with the core being 18 percent.

| | |
|---|---|
| Aluminum | 1.0 |
| $CaF_2$ | 55.0 |
| Fe Powder | 11.0 |
| MgO | 5.0 |
| Potassium Oxalate | 1.0 |
| MnO | 7.0 |
| L.C. FeMn | 5.0 |
| Mg-Al (alloy) (50% Mg) | 15.0 |
| | 100.0 |

Fe powder was used as a filler to make a compact core because the Mg-Al alloy has a different specific density than aluminum or magnesium powder alone and therefore takes up less space in the core.

Yet another wire D was made using aluminum-magnesium alloy with nickel additions. This wire consisted of a mild steel sheath containing the following ingredients given in weight percent of the core with the core being 18 percent.

| | |
|---|---|
| Aluminum | 1.0 |
| $CaF_2$ | 55.0 |

| | |
|---|---|
| Fe Powder | 8.0 |
| MgO | 5.0 |
| Potassium Oxalate | 1.0 |
| MnO | 7.0 |
| L.C. FeMn | 5.0 |
| Mg-Al (alloy) (50% Mg) | 15.0 |
| Ni | 3.0 |

Having described the invention in general terms and with reference to certain preferred embodiments the following examples are provided to assist one skilled in the art in the practice of the invention.

EXAMPLE I

A three thirty-seconds in. diameter 18 core weight percent electrode of the type A was made and used to make multipass welds in three-fourths inch thick mild steel plate at 390 amperes and 28 volts with a travel speed of 15 I.P.M.

The mechanical properties of the weld were as follows:

82,600 psi Ultimate Tensile Strength; 68,200 Yield Strength. Impact properties were 5.1 ft./lbs. at 0° F and 3.9 ft./lbs. at 20° F. The wire produced a smooth low spatter arc.

EXAMPLE II

A type B wire containing nickel was made in three thirty-seconds in. diameter and used to make a multipass weld in three-fourths inch thick meld steel plate at 350 ampere and 26 volts with a travel speed of 15 I.P.M.

The mechanical properties were as follows:

89,400 psi U.T.S.; 74,900 psi Y.S.; and impact properties of 25.9 – 22.5 ft./lbs. at 0° F and 19.7–21.0 ft./lbs. at − 20° F. This compares with prior art electrodes which usually produce about 6–7.1 ft./lbs. at 0° F and 5–6 ft./lbs. at − 20°F with a harsh high spatter arc.

EXAMPLE III

Wire C was made into three thirty-seconds in. diameter wire and tested as in Example I with the following results:

79,900 psi U.T.S.; 64,600 psi Y.S. and impact properties of 11.2 ft./lbs. at 0° F and 6.5 ft./lbs. at −20° F, the arc was smooth and spatter free.

EXAMPLE IV

Wire D was made into three thirty-seconds in. diameter wire and tested as in Example IV with the following results:

98,400 psi U.T.S.: 92,900 psi Y.S. and impact properties of 27.9 – 26.9 ft./lbs. at 0°F and 21.4 – 20.5 ft./lbs. at 20°F.

It can be concluded from the above that the invention provides an electrode which produces almost 2 to 3 times the impact properties of prior art electrodes while producing a smooth low spatter arc. While the examples illustrate a cored wire having an 18 weight percent core ratio it should be understood that the core may be varied from about 16 to about 20 percent. Likewise the diameter of the cored wire may be varied from the three thirty-seconds in. diameter illustrated herein.

What is claimed is:

1. A consumable wire electrode for electric arc welding in air comprising a hollow sheath of mild steel and a flux core comprised essentially of the following ingredients in core weight percent when the core is from about 16 to about 18 percent of the total electrode:

| | |
|---|---|
| Aluminum | 5-20 |
| Calcium Fluoride ($CaF_2$) | 35-70 |
| Magnesium Oxide (MgO) | 2-10 |
| Potassium Oxalate ($K_2C_2O_4$) | 0.5-2.5 |
| Manganese Oxide (MnO) | 1.5-20 |
| Low Carbon FeMn | 3-9% |
| Magnesium | 3-10 | with the proviso that the ratio of manganese oxide to magnesium be maintained between 0.5 to about 2.0.

2. A wire according to claim 1 including 2 to 5 core weight percent nickel.

3. A wire according to claim 1 wherein the magnesium is added as magnesium-aluminum alloy.

4. A consumable wire electrode for electric arc welding in air comprising a hollow sheath of mild steel and a flux core comprising the following ingredients in core weight percent when the core is 18 percent of the total electrode:

| | |
|---|---|
| Aluminum | 15.0 |
| $CaF_2$ | 58.3 |
| MgO | 6.0 |
| Potassium Oxalate | 1.2 |
| MnO | 8.5 |
| L.C. FeMn | 6.0 |
| Magnesium | 5.0 |

5. A consumable wire electrode for electric arc welding in air comprising a hollow sheath of mild steel and a flux core comprising the following ingredients in core weight percent when the core is 18 percent of the total electrode:

| | |
|---|---|
| Aluminum | 11.0 |
| $CaF_2$ | 58.6 |
| MgO | 6.0 |
| Potassium Oxalate | 1.2 |
| MnO | 8.5 |
| L.C. FeMn | 6.0 |
| Mg | 5.0 |
| Nickel | 3.7 |

6. A consumable wire electrode for electric arc welding in air comprising a hollow sheath of mild steel and a flux core comprising the following ingredients in core weight percent when the core is 18 percent of the total electrode:

| | |
|---|---|
| Aluminum | 1.0 |
| $CaF_2$ | 55.0 |
| Fe Powder | 11.0 |
| MgO | 5.0 |
| Potassium Oxalate | 1.0 |
| MnO | 7.0 |
| L.C. FeMn | 5.0 |
| Mg-Al (alloy)(50% Mg) | 15.0 |

7. A consumable wire electrode for electric arc welding in air comprising a hollow sheath of mild steel and a flux core comprising the following ingredients in core weight percent when the core is 18 percent of the total electrode:

| | |
|---|---|
| Aluminum | 1.0 |
| $CaF_2$ | 55.0 |
| Fe Powder | 8.0 |
| MgO | 5.0 |
| Potassium Oxalate | 1.0 |
| MnO | 7.0 |
| L.C. FeMn | 5.0 |
| Mg-Al (alloy) (50% Mg) | 15.0 |
| Nickel | 3.0 |

* * * * *